United States Patent
Krebill et al.

(10) Patent No.: US 6,945,420 B2
(45) Date of Patent: Sep. 20, 2005

(54) REVERSE BUCKLING SANITARY RUPTURE DISC ASSEMBLY

(75) Inventors: Michael D. Krebill, Kansas City, MO (US); E. Dean Miller, Lee's Summit, MO (US)

(73) Assignee: Fike Corporation, Blue Springs, MO (US)

( * ) Notice: Subject to any disclaimer, the term of this patent is extended or adjusted under 35 U.S.C. 154(b) by 14 days.

(21) Appl. No.: 10/402,550

(22) Filed: Mar. 28, 2003

(65) Prior Publication Data

US 2004/0189020 A1 Sep. 30, 2004

(51) Int. Cl.$^7$ ............................................... B65D 90/36
(52) U.S. Cl. ................................... 220/89.2; 292/308
(58) Field of Search ............................. 220/89.2, 89.4, 220/89.1; 292/308, 309, 310; 137/68.19, 68.21, 68.25, 68.26, 68.27

(56) References Cited

U.S. PATENT DOCUMENTS

| | | | | |
|---|---|---|---|---|
| 3,109,554 A | * | 11/1963 | Porter et al. ............... | 220/89.2 |
| 3,169,658 A | * | 2/1965 | Porter ....................... | 220/89.2 |
| 3,445,032 A | * | 5/1969 | Hansen et al. .............. | 220/89.2 |
| 3,704,807 A | * | 12/1972 | Lidgard ..................... | 220/89.2 |
| 4,072,160 A | | 2/1978 | Hansen | |
| 4,404,982 A | | 9/1983 | Ou | |
| 4,512,171 A | * | 4/1985 | Mozley ....................... | 72/55 |
| 4,576,303 A | | 3/1986 | Mundt et al. | |
| 4,669,626 A | | 6/1987 | Mozley | |
| 4,759,460 A | | 7/1988 | Mozley | |
| 5,022,424 A | * | 6/1991 | Reynolds et al. ......... | 137/68.27 |
| 5,368,180 A | * | 11/1994 | Farwell et al. ............. | 220/89.2 |
| 6,006,938 A | | 12/1999 | Mozley et al. | |
| 6,178,983 B1 | | 1/2001 | Culliinane et al. | |
| 6,241,113 B1 | * | 6/2001 | Mozley et al. ............. | 220/89.1 |
| 6,318,576 B1 | | 11/2001 | Graham et al. | |
| 6,446,653 B2 | | 9/2002 | Cullinane et al. | |
| 6,494,074 B2 | | 12/2002 | Cullinane et al. | |

* cited by examiner

Primary Examiner—Lien M. Ngo
(74) Attorney, Agent, or Firm—Hovey Williams LLP

(57) ABSTRACT

A metal reverse buckling sanitary rupture disc is provided having a central bulged section in which the convex surface of the bulged section is relatively smooth and of substantially uninterrupted configuration. A small segment region of the central bulged section is strain hardened by plastic deformation causing the segment region to have greater residual stress than the remainder of the central bulged section. When the disc is subjected to an overpressure condition against the convex surface of the bulged section sufficient to effect reversal of the bulged section, such reversal commences at the higher residual stress segment region of the bulged section.

24 Claims, 3 Drawing Sheets

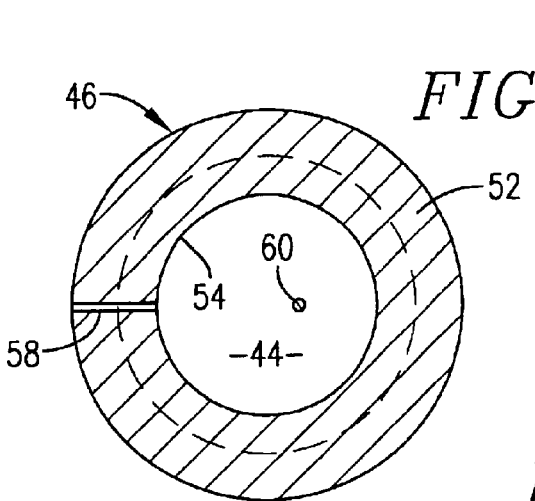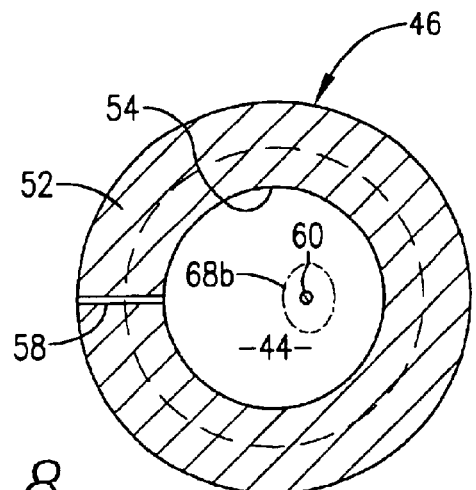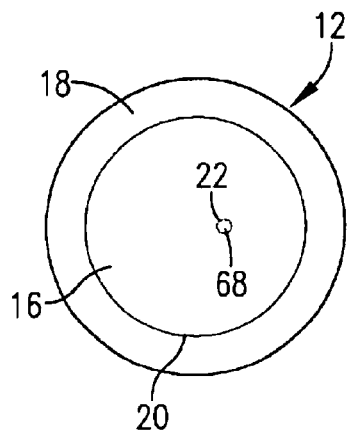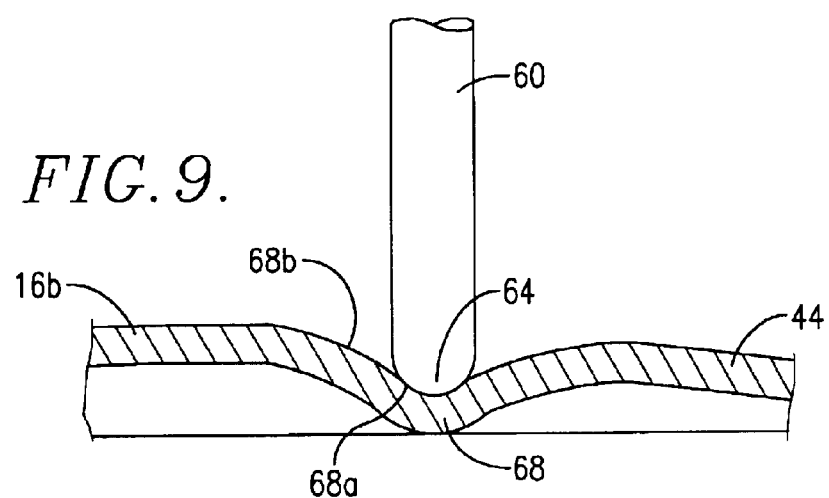

REVERSE BUCKLING SANITARY RUPTURE DISC ASSEMBLY

BACKGROUND OF THE INVENTION

1. Field of the Invention

This invention relates to a reverse buckling rupture disc assembly especially adapted for use in sanitary pressure vessel piping applications where the disc reliably ruptures under overpressure conditions.

Pharmaceutical, biochemical and food processing equipment require that sanitary conditions be maintained at all times, which necessitates frequent cleaning of the equipment, usually with steam or other sanitization agents. These processes often are operable at relatively low pressures in which overpressures in the equipment or piping connected thereto must be relieved at levels as low as about 2 psig up to about 50–60 psig. It is conventional to employ reverse buckling rupture discs for applications, but it has been found difficult to provide narrow range burst pressure tolerances at these ranges.

In order to accomplish reliable disc rupture at low differential pressures, it has now been found that a required rupture specification can be met while at the same time avoiding material collection problems on the surface of the disc by subjecting the disc material to a force which deflects a segment region of the disc from the main body thereof, and by thereafter applying a force to the disc which returns the deflected segment region to its initial position whereby the metal of the deflected and returned segment region has an altered grain structure as compared with the metal of the remainder of the central bulged section. The metal of the deflected and returned segment region exhibits higher residual stress, resulting from strain hardening through plastic deformation, than the disc material surrounding the initially deflected segment region.

This invention also relates to an improved process for preparing a smooth bulged surface reverse buckling rupture disc assembly which will open reliably at pressures within a range of, e.g., about psig 2 to about 50 psig, and that can be mounted in standard quick coupling fittings commonly employed in sanitary condition processing equipment without modification of the coupling structure.

2. Background of the Invention

In order to obtain repeatable low overpressure opening of rupture disc assemblies designed for low pressure applications, one commercial approach to the requirement has been to provide a reverse buckling rupture disc in which a depression is deliberately formed in the dome of the rupture disc. The depressed segment region in the domed area of the disc is strategically located in a position such that the domed part of the disc will fail first at the area of the depression. The disc thus reverses and opens at what has been described in the prior art as an overpressure less than a disc without a depressed segment region.

However, a depression in the process side convex surface of the bulged area of the disc presents a cavity that serves as a collection point for food, pharmaceuticals or the like. As a result, cleaning of the processing equipment with steam or the like is difficult and may require breakdown of the components in which the rupture disc is positioned in order to insure removal of material that may have collected in the depressed segment region.

Exemplary of a prior art rupture disc assembly having a depression in the convex surface of the disc is Cullinane, et al., U.S. Pat. No. 6,494,074, in which a pointed tool forced against the backed up convex surface of the bulged section of a disc forms an indentation in the disc at or near the apex of the domed shape. The shape, area and depth of the indentation may be selectively varied. In each instance though, the indentation in the convex surface of the bulged section of the disc presents a cavity which may collect material from the process operation that is protected from a predetermined overpressure by the disc mounted in a pipe fitting leading to the processing pressure vessel. Although Cullinane et al. suggest that the depth of indentation may be altered, but not eliminated, the patentees did not perceive that a smooth surface disc could be provided which avoids material collection problems in an indentation in the disc by forming a depression in the disc which is then returned to its initial smooth surface position, while at the same time meeting stringent burst specifications.

FIGS. 6–9 of Graham et al., U.S. Pat. No. 6,318,576, illustrate a hygienic quick breakdown and reconnection fitting conventionally used in pharmaceutical, biochemical and food processing operations, which is adapted to receive and retain a reverse bulging rupture disc assembly. The fitting includes two couplings having flanges which are retained in adjacent interconnected relationship by a quick release clamp ring.

Reverse buckling rupture discs are preferred for a variety of applications because a reverse buckling disc will open at a pressure near the bursting pressure of the disc without producing fatigue and failure which oftentime occurs with a forward acting disc when the disc is operated near its burst pressure for long periods of time. One theory of the sequence of operation of a non-knife blade reverse buckling rupture disc is explained in Mozley, U.S. Pat. No. 4,512,171, which is incorporated herein by reference thereto.

A commercially acceptable reverse buckling sanitary rupture disc should ideally meet current ASME BPE (Bioprocessing Equipment) and 3-A (milk and dairy) standards, which require the equipment to be free of surface imperfections such as crevices, gouges, obvious pits, etc.

SUMMARY OF THE INVENTION

In particular, the sanitary reverse buckling disc assembly incorporates a metal rupture disc having a central bulged section including a convex surface and an opposed concave surface with a flange portion surrounding the central bulged section. The convex surface of the bulged section is relatively smooth and of substantially uninterrupted configuration. A segment region of the bulged section has altered grain structure as compared with the remaining metal of the bulged section of the disc and defines a segment region in a preferred embodiment having a outer generally circular boundary located nearer to the uppermost part of the bulged section than to the flange portion of the disc. The segment region has been physically displaced from the main body of the bulged section, and then returned to its original position. The altered grain structure of the segment region results from strain hardening of the metal through plastic deformation creating greater residual stress in the segment region than in the remainder of the bulged section.

The region of the disc which has been deflected and returned to its original disposition is subjected to stresses in two directions that in sum are greater than the stresses imposed on the main body of the bulged section of the disc during final bulging. The result is a disc having a bulged section without an indentation or depression which could collect materials from the processing apparatus and therefore can be more readily maintained and cleaned. Moreover, the deflection and subsequent return of a segment region of the bulged section of the disc produces a disc having necessary rupture tolerance characteristics permitting use of the disc in pharmaceutical, biochemical and food processing applications where the specification requires a close tolerance low burst pressure rupture disc product without surface irregularities.

In one process for producing a sanitary rupture disc having a region in the bulged section of the disc of greater residual stress and higher tensile and compressive strength than the main body of the bulged section, a flat disc blank is located in a fixture having a deflection post such that the post is in engagement with one surface of the disc in a position offset somewhat from what will become the center of the bulged section. The deflection post preferably has a hemispherical blank engaging end. The post diameter is selected to form an indentation in the blank of predetermined extent depending upon the size of the rupture disc, the material from which the disc is fabricated, the tensile strength of the metal blank, the diameter of the bulged area to be formed in the blank, the positioning of the indentation with respect to what will become the central axis of the bulged section of the disc, and the burst pressure differential specification for the final product.

Pre-bulging pressure is applied to the face of the rupture disc blank opposite the deflection post while the blank is held in the fixture to effect partial bulging of the blank and at the same time cause an indentation to be formed in the partially bulged convex surface of the blank in engagement with the deflection post. The diameter of the area subjected to the pre-bulge pressure should preferably be equal to the diameter of the final bulged section of the disc.

Next, either the deflection post is removed from the pre-bulging fixture, or the preformed blank is positioned in a separate final bulging non-post fixture. Sufficient pressure is applied to the concave surface of the pre-bulged disc to effect final bulging of the central section of the disc and at the same time return the indentation previously formed in the disc to its initial position with respect to the remainder of the disc body prior to formation of the indentation in the disc body by the deflection post. As a result, both the convex and concave surfaces of the disc are smooth and free of projecting surfaces or depressions that could collect materials thereon or therein, thus interfering with or impeding cleaning of the equipment with a sanitizing agent such as steam.

The two step process of first forming an indentation of predetermined extent and depth in the portion of the blank body that is to be bulged, and then removing the indentation by returning the metal of the indentation to its initial position causes the area that has been indented and then restored to have a higher residual stress than the remainder of the final bulged section of the disc, as a result of the plastic deformation of the metal in the segment region. The segment region, which has an altered grain structure, is relatively small compared with the overall area of the bulged section, is work hardened and exhibits a higher tensile and compressive strength, thus behaving differently during use than the remainder of the bulged section when an overpressure is applied to the convex face of the rupture disc.

In an alternate embodiment of the fabrication process of this invention, rather than pre-bulging the disc blank against a fixed bulging post, the post itself may be mounted for movement toward and away from the blank to effect deflection of a segment region of the disc blank from the main body of the disc blank. Otherwise the processes are essentially the same.

BRIEF DESCRIPTION OF THE DRAWINGS

FIGS. 7 and 8 are horizontal cross-sectional views taken substantially along the lines 7—7 and 8—8 of FIGS. 3 and 4 respectively and looking in the direction of the arrows;

FIG. 9 is an enlarged fragmentary schematic representation of the pre-bulged disc having an indented segment region in the partially bulged convex surface of the disc blank produced by the deflection post and which was formed by the deflection post;

FIG. 10 is a plan view of the rupture disc and schematically illustrating the discrete region of the central bulged section of the disc which was indented and then returned to its initial position;

DESCRIPTION OF THE PREFERRED
EMBODIMENTS OF THE INVENTION

Figure 1:
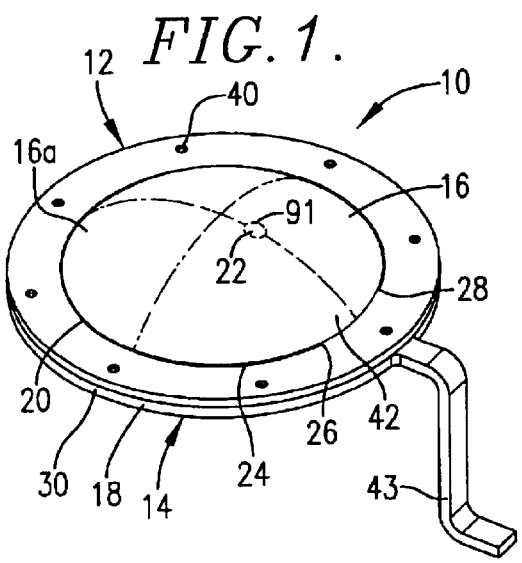
FIG. 1 is a perspective view of a reverse buckling sanitary rupture disc assembly.

A reverse buckling sanitary rupture disc assembly 10 embodying the preferred concepts of this invention is illustrated in FIG. 1 of the drawings. Disc assembly 10 includes a rupture disc 12 and a support ring 14 secured thereto. The rupture disc assembly 10 is particularly adapted for use in hygienic, sanitary applications in industries such as pharmaceuticals, biochemical and food processing operations. Accordingly, the components of rupture disc assembly 10 are preferably fabricated of corrosion resistant metal material such as any one of a number of conventional stainless steel alloys. Rupture disc 12 has a central bulged section 16, and an annular flange portion 18. A transition zone 20 joins the inner periphery of flange portion 18 to the outer circular margin of bulged section 16.

The bulged section 16 of rupture disc 12 has a relatively small region 22 (FIGS. 1 and 10) which is offset from the central axis of bulged section 16. The metal of region 22 has an altered grain structure and exhibits increased residual stress and higher tensile and compressive strength than the remainder of bulged section 16, and has been formed by indenting the convex surface 16a, and then returning the indentation to its initial position so that the convex surface 16a of bulged section 16 is smooth without any significant interruptions.

Rupture disc 12 is provided with a semi-circular score line 24 that is complemental with transition zone 20, located in the flange portion 18 of the disc, in the transition zone 20, or in the bulged section 16 adjacent transition zone 20, and preferably extending around substantially the entire perimeter of the bulged section 16. It can be seen from FIG. 1 that score line 24 has terminal ends 26 and 28 that are spaced from each other along the length of transition zone 20. In lieu of the semi-circular score line 24, scores in the form of a cross score pattern may be provided in the central bulged section 16 in disposition such that none of the score lines go through the segment region 22.

Figure 2:
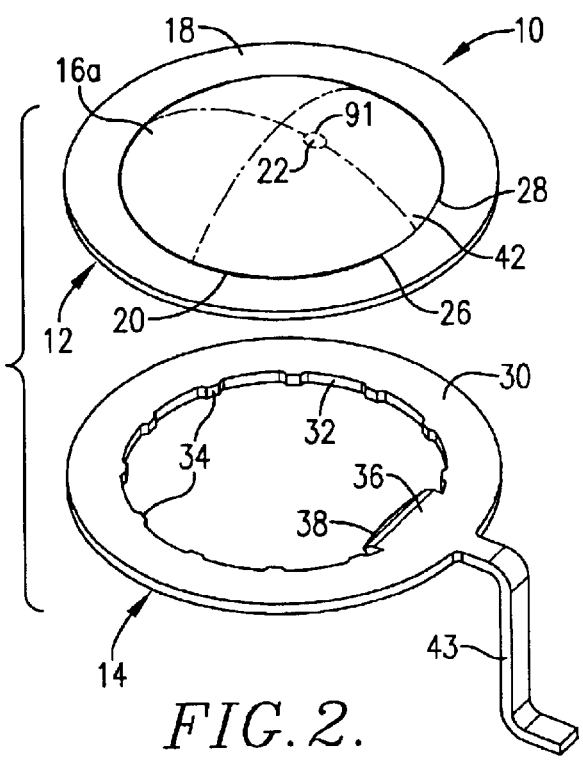
FIG. 2 is an exploded view of the components making up the reverse buckling sanitary rupture disc assembly.

The backup ring 14 has a main annular body 30 configured to underlie the flange portion 18 of rupture disc 12. It is to be seen from FIGS. 2 and 14 that the inner semi-circular edge 32 of annular body 30 has circumferentially spaced projections 34 that extend inwardly from edge 32 of body 30. An inwardly extending tongue 36 is integral with body 30, has an outermost downturned circular end portion 38, and also projects into the inner opening of ring body 30.

In its assembled condition, the annular body of support ring 30 is secured to the flange 18 of disc 12 by fasteners 40 which may comprise screws, tack welds, adhesive or other equivalent fastening means. The tongue 36 of backup ring 14 is substantially aligned with the terminal ends 26 and 28 of score line 24 and acts as a backup for the hinge area 42 of bulged section 16 of rupture disc defined by score line 24. The projections 34 are of a size and strategically located to directly underlie and support the bulged section 16. If desired, an integral, essentially Z-shaped component 43 may be provided as a part of the annular body 30 of rupture disc assembly 10 for assisting an individual in properly orienting the assembly during installation. An annular gasket (not shown) may be provided in association with the flange portion and support ring of the disc assembly.

Fabrication of the rupture disc 12 is preferably accomplished in two stages. The first stage involves pre-bulging of the disc in a manner to form an indentation in the convex surface of a disc blank 44. The second stage involves final bulging of the disc under conditions such that the indentation in the convex surface of the bulged section of the disc is removed by returning the indented segment region of the bulged section to its initial position.

Figure 3:
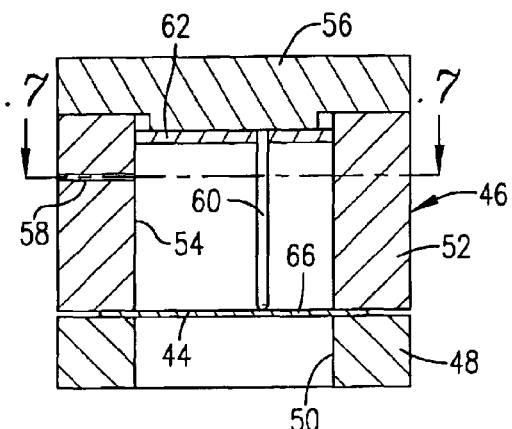
FIG. 3 is a schematic cross-sectional representation of apparatus for pre-bulging a rupture disc blank that includes a deflection post for forming an indentation in one surface of the blank.

A fixture 46 for forming an indentation of predetermined configuration in the metal rupture disc blank is schematically illustrated in FIG. 3. It is to be understood in this respect that the schematic depiction of fixture 46 is for illustrative purposes only and not intended to be representative of a particular type of fixture for accomplishing the intended result. The lower base ring 48 of fixture 46, which in its preferred form is of cylindrical configuration, has a central opening 50. The cylindrical clamping ring 52 of fixture 46 has a central passage 54 aligned with and has the same shape and cross-sectional area as opening 50. Cover member 56 closes the opened upper end of passage 54 and provides a pressure seal between cover 56 and clamping ring 52. An opening 58 through the side wall of clamping ring 52 serves to allow gas such as air to escape from the interior of clamping ring 52.

An elongated deflection post 60 is positioned within passage 54 and preferably is coupled to a support element 62 laying against the under face of cover 56. After placement of blank metal disc on support base ring 48, that is of circular shape in the case of conventional rupture disc assemblies, the disc is clamped in place by ring 52 and base ring 48 positioned as shown in closing relationship to passage 54. The post 60 is of a length such that the hemispherical terminal end 64 rests against the surface 66 of disc blank 44.

Figure 4:
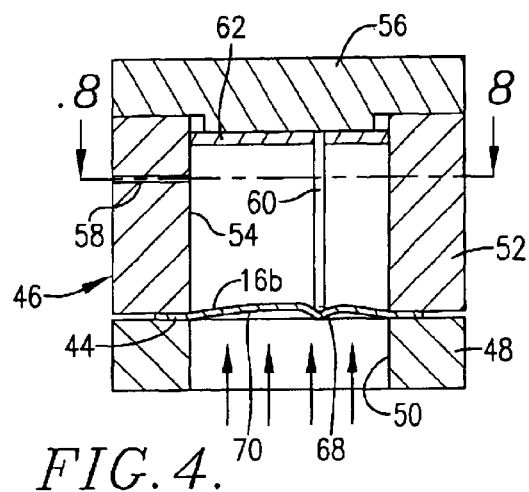
FIG. 4 is a schematic cross-sectional representation of the pre-bulging step using the fixture illustrated in FIG. 3 and which results in a segment region of the rupture disc blank being deflected from the main body of the blank.

Pre-bulging pressurized fluid is introduced into fixture 46 via central opening 50 to effect pre-bulging of the disc blank 44, which causes the segment region 68 of disc 44 to be deflected from the main body of pre-bulged section 16b in a downward direction as shown in FIG. 4. The depth of the indented segment region 68, and the configuration and extent of such indentation is a function of the diameter of post 60, the shape and radius of the hemispherical end 64 of post 60 and the pressure applied to the surface 70 of disc blank 44. In the case of a post 60 having a hemispherical end 64, the indented segment region 68 has a generally hemispherical portion 68a and a tapered somewhat conical surface 68b leading to and terminating in the main body portion 16b of bulged section 16. Viewing FIG. 8, it can be seen that the central generally hemispherical indented segment region 68a is surrounded by a generally circular or oval shaped indented portion 68b radiating outwardly from the indented segment region 68a. During application of pressure to disc blank 44 to pre-bulge the disc blank, air within the cavity defined by passage 54 and cover 56 may escape from passage 54 via opening 58 in clamping ring 52.

Figure 6:
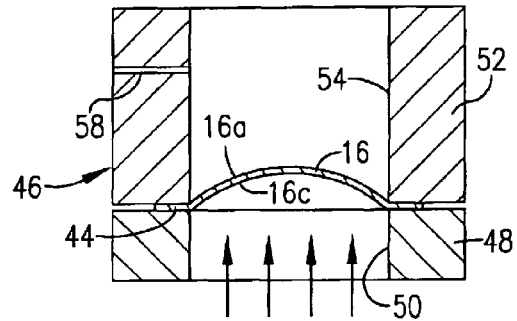
FIG. 6 is a schematic cross-sectional representation of the fixture as shown in FIG. 5 and illustrating the manner in which sufficient pressure is applied to the concave face of the pre-bulged rupture disc to effect final bulging of the rupture disc and effect return of the previously indented segment region of the bulged section to its initial position.

Upon completion of the pre-bulging step, the cover 56 and associated deflection post 60 are removed from clamping ring 52. Fluid pressure is applied to the concave face 16c of disc blank 44 sufficient to complete final bulging of the bulged section 16 of rupture disc 12 is depicted in FIG. 6. The amount of pressure applied during final bulging of rupture disc 12 should be adequate to not only completely bulge disc 12 forming bulged section 16, but also sufficient to return indented segment region 68 to its initial position. Thus, the convex surface of 16a of bulged section 16 is smooth and uninterrupted throughout its entire area including segment region 68 defining region 22. Indentation of region 68 followed by return of such indented region to its initial position causes the metal of region 22 to have an altered grain structure.

The support ring 30 is affixed to flange 18 of bulged rupture disc 12 using suitable fasteners with the projections 34 underlying score line 24 and supporting the bulged section 16. Tongue 36 is substantially aligned with the hinge area 42 of bulged section 16.

The rupture disc assembly 10 is adapted to be mounted between flanged couplings of the type illustrated in FIGS. 6–9 U.S. Pat. No. 6,318,576 with the convex surface 16a of rupture disc 12 facing toward the process side of the equipment to be protected. Arm 43 on ring 30 provides the installer of the disc assembly 10 with information as to proper orientation of the assembly between the flange couplings during installation to insure that the convex surface 16*a* of rupture disc 12 faces toward the process side of the equipment. The arm 43 is also a continuing visual indicator that an installed disc is in proper orientation.

In the event an overpressure condition occurs in the process vessel or piping protected by rupture disc assembly 10, which is sufficient to effect reversal of the bulged section 16, bulged section 16 opens along score line 24 while being retained by hinge portion 42. The reverse rupture commences at segment 68 defining region 22 because of the more highly stressed, altered grain structure of the segment region 68. Because of the existence of the higher stressed region 22 in bulged section 16, the overpressure exerted on the convex face 16*a* of bulged section 16 is believed to initiate reversal of bulged section 16 and ultimately to effect opening of bulged section 16 along the length of score line 24.

It has been unexpectedly discovered that by deflecting a segment of what will become the bulged section 16 of the disc as described in detail above, and then returning that segment to its initial position to present a smooth, uninterrupted convex surface, reversal of the disc is a function of discontinuity of the grain structure in the segment region 68. This is to be contrasted with simply providing a depression in the disc as illustrated and described in U.S. Pat. No. 6,494,074, in which rupture is initiated as the result of altered load geometry and subsequent stress distribution of the modified convex surface.

Figures 12, 13:
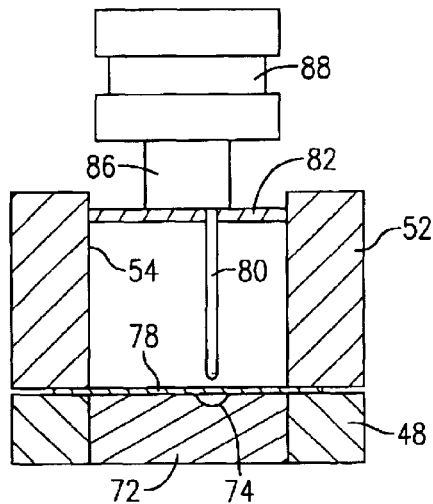
FIG. 12 is an enlarged schematic cross-sectional view of an alternate fixture containing a shiftable deflection post for forming an indentation in the rupture disc blank.
FIG. 13 is a schematic cross-sectional view of the fixture as shown in FIG. 12 and illustrating the manner in which a deflection post is shifted into disposition forming the indentation in the rupture disc blank.

An alternate procedure for fabricating disc 12 is illustrated schematically in FIGS. 12 and 13. In this instance, the base ring 48 is provided with a central insert 72 having a cavity 74 in the upper surface thereof strategically located to form an indentation 76 in the disc blank 78. Rather than being provided with a cover such as cover 56, the deflection post 80, which is similar to post 60, is carried by a piston 82 reciprocal in the central passage 54 of the clamping ring 52. Piston 82 is secured to the ram 86 of a hydraulic cylinder 88.

Accordingly, blank 78 is positioned between base ring 48 having the insert 72 therein, the blank 78 is secured between clamping ring 52 and base ring 48, whereupon ram 86 is actuated to move the piston 82 and deflection post 80 downwardly to form indentation 76 in disc blank 78 of a configuration defined by the cavity 74 in insert 72.

The disc blank 78 having indentation 76 form therein is then subjected to full bulging pressure in the fixture illustrated in FIG. 6 which causes the indentation 76 to be returned to its initial position whereby the convex surface of the disc is smooth and uninterrupted, leaving a metal segment region stressed to a greater degree than the remaining portion of the bulged section of the disc as previously described.

Figure 14:
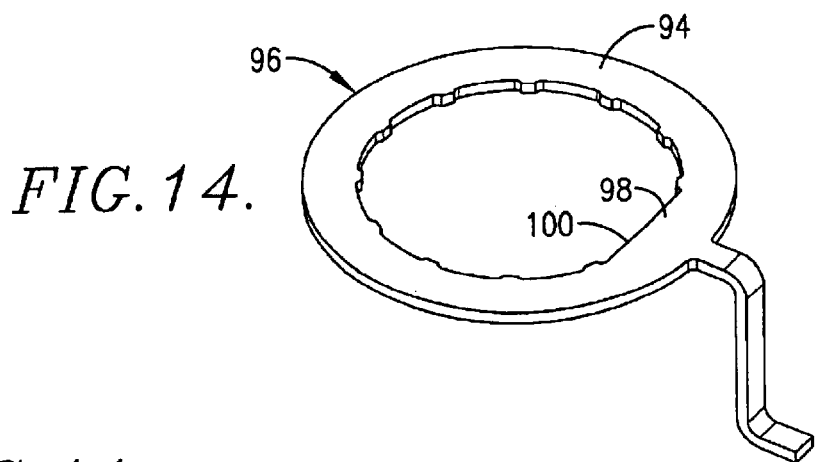
FIG. 14 is a perspective view of an alternate support ring for the rupture disc.
Figure 11:
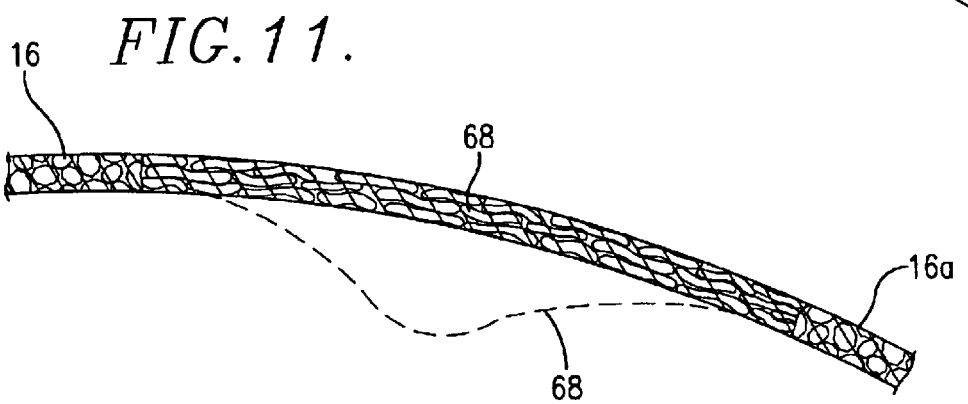
FIG. 11 is an enlarged cross-sectional representation of a portion of the bulged section of the rupture disc and which schematically illustrates the altered grain structure of the indented segment region of the bulged section of the disc as compared with the metal of the remaining portion of the bulged section.

FIG. 14 illustrates an alternate embodiment of the support ring wherein the annular body 94 of support ring 96 is similar to ring 30 except for the construction of the tongue 98 which has a rectilinear outer margin 100 in lieu of the circular edge of the tongue 36 of support ring 30.

EXAMPLE

Figure 5:
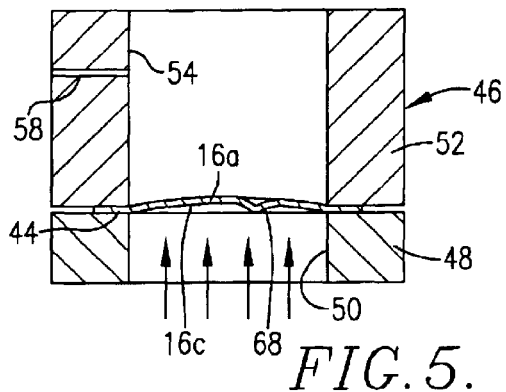
FIG. 5 is a schematic cross-sectional representation of the fixture of FIGS. 3 and 4 with the deflection post removed and illustrating the manner in which final bulging pressure may be applied to the concave face of the disc.

An exemplary disc 12 prepared in accordance with the preferred process of this invention and depicted in FIG. 10 is preferably fabricated from 2 mil 316 stainless steel and has an overall diameter of about 2.5 inches. Pre-bulging of the disc 12 as schematically illustrated in FIG. 4 is accomplished under a pressure of about 50 psig to form a depression 68 in the disc blank 44 as shown in FIG. 4. Final bulging of the disc as schematically shown in FIGS. 5 and 6 is carried out under a pressure of about 200 psig producing a bulged disc in which the height of the dome is about 0.34 inch. The outer boundary 91 (of FIG. 10) of the metal segment region 68 of the bulged section of the disc, which has been subjected to greater stress than the remaining metal of the bulged section 16 has a nominal area of about 0.4 square inch. The segment region 68 in the exemplary disc is spaced from the central axis of bulged section 16 about 0.3 inch. This disc has a nominal burst pressure of about 8 psig.

What is claimed is:

1. A reverse buckling sanitary rupture disc comprising:
   a unitary one-piece metal rupture disc having a central bulged section including a convex surface and an opposed concave surface, a flange portion surrounding the central bulged section, and a transition zone joining the flange portion to the central bulged section,
   the bulged section including a segment defining a discrete region in which the metal of the segment region has altered grain structure that exhibits greater residual stress than the metal of the remainder of the central bulged section, and
   the opposed convex and concave surfaces of the bulged section being smooth and of uninterrupted configuration throughout the entire area thereof including the segment defining said discrete region of the bulged section.

2. A reverse buckling sanitary rupture disc as set forth in claim 1, wherein said central bulged section has a central axis and said segment region of the central bulged section is located closer to said central axis of the bulged section than to said transition zone.

3. A reverse buckling sanitary rupture disc as set forth in claim 1, wherein the tensile strength of the metal of said segment region of the bulged section is greater than the tensile strength of the metal of said remainder of the central bulged section.

4. A reverse buckling sanitary rupture disc as set forth in claim 1, wherein the compressive strength of the metal of said segment region of the bulged section is greater than the compressive strength of the metal of said remainder of the central bulged section.

5. A reverse buckling sanitary rupture disc as set forth in claim 1, wherein the area of said segment region of the bulged section is substantially less than the overall area of the bulged section.

6. A reverse buckling sanitary rupture disc as set forth in claim 1, wherein said segment region of the bulged section is located in proximal, spaced relationship from said central axis of the bulged section of the disc.

7. A reverse buckling sanitary rupture disc as set forth in claim 1, wherein said segment region of the bulged section is altered and strain hardened by plastic deformation of the metal.

8. A reverse buckling sanitary rupture disc as set forth in claim 1, wherein the area of said segment region of the bulged section is a small fraction of the overall area of the bulged section.

9. A reverse buckling sanitary rupture disc as set forth in claim 1, wherein said segment region of the bulged section is of generally circular shape.

10. A reverse buckling sanitary rupture disc as set forth in claim 1, wherein said segment region of the bulged section has been formed by physical displacement thereof from the main body of the bulged section and then physically returned to its initial position.

11. A reverse buckling sanitary rupture disc as set forth in claim 1, wherein said bulged section is provided with a score line.

12. A reverse buckling sanitary rupture disc as set forth in claim 11, wherein said score line is in the flange portion of the disc.

13. A reverse buckling sanitary rupture disc as set forth in claim 11, wherein said score line is in the bulged section in proximity to the transition zone of the disc.

14. A reverse buckling sanitary rupture disc as set forth in claim 11, wherein said score line is a cross score in the bulged portion outside of the segment region of the bulged section.

15. A reverse buckling sanitary rupture disc as set forth in claim 11, wherein said score line is of generally semi-circular configuration.

16. A reverse buckling sanitary rupture disc as set forth in claim 15, wherein the score line extends around only a part of the circumferential extent of the transition zone between the bulged section of the disc and the flange portion thereof.

17. A reverse buckling sanitary rupture disc as set forth in claim 1, wherein the ratio of the area of said segment region of the bulged section to the overall area of the bulged section is within the range of from about 1 to about 15 to 1 to about 6,500.

18. A reverse buckling of sanitary rupture disc as set forth in claim 1, wherein the ratio of the area of said segment region to the area of the bulged section is about 1 to about 175.

19. A reverse buckling sanitary rupture disc assembly comprising:

a unitary one-piece metal rupture disc having a central bulged section presenting a central axis and including a convex surface and an opposed concave surface, a flange portion surrounding the central bulged section, and a transition zone joining the flange portion to the central bugled section, the bulged section a segment defining a discrete region in which the metal of the segment region has altered grain structure that exhibits greater residual stress than the metal of the remainder of the central bulged section, the opposed convex and concave surfaces of the bulged section being smooth and uninterrupted throughout the entire area thereof including the segment defining said discrete region of the bulged section; and an annular member mounted in supporting relationship to the face of the flange adjacent the concave surface of the rupture disc, said annular member having an inner edge, said inner edge being provided with inwardly extending, circumferentially spaced projections, which underlie the transition zone of the rupture disc and a part of the concave surface of the bulged section of the disc.

20. A reverse buckling sanitary rupture disc assembly as set forth in claim 19, wherein said disc is provided with a generally C-shaped score line adjacent to the transition zone, said score line having opposed, spaced ends presenting a hinge for the bulged section, said inner edge of the annular member being provided with a hinge support component in general alignment with the hinge of the bulged section.

21. A reverse buckling sanitary rupture disc assembly as set forth in claim 20, wherein said support component has an inwardly extending margin of generally semi-circular configuration.

22. A reverse buckling sanitary rupture disc assembly as set forth in claim 20, wherein said support component has an inwardly extended margin of generally rectilinear configuration.

23. A reverse buckling sanitary rupture disc assembly as set forth in claim 19, wherein said bulged section is provided with a score line extending around substantially the entire perimeter of the bulged section adjacent the transition zone, said projections of the annular member being positioned in generally overlying relationship to the score line.

24. A reverse buckling sanitary rupture disc assembly as set forth in claim 19, wherein said annular member is provided with an arm extending therefrom for facilitating alignment of the rupture disc assembly with a receptacle therefor.

* * * * *